United States Patent [19]

Kawamoto

[11] Patent Number: 4,467,669
[45] Date of Patent: Aug. 28, 1984

[54] WORKING FLUID DISTRIBUTING SYSTEM FOR A BELT DRIVE CONTINUOUSLY-VARIABLE SPEED AUTOMATIC TRANSMISSION

[75] Inventor: Mutsumi Kawamoto, Nagoya, Japan

[73] Assignee: Aisin Warner Kabushiki Kaisha, Aichi, Japan

[21] Appl. No.: 342,967

[22] Filed: Jan. 26, 1982

[30] Foreign Application Priority Data

Feb. 7, 1981 [JP] Japan .................................. 56-17072

[51] Int. Cl.³ ...................... F16H 47/04; F16H 37/00; F16H 9/00
[52] U.S. Cl. ...................................... 74/688; 74/689; 74/740; 474/72
[58] Field of Search ................... 474/8, 18, 28, 29, 72, 474/148; 74/689, 740, 730, 695, 687, 606 R

[56] References Cited

U.S. PATENT DOCUMENTS

| | | | |
|---|---|---|---|
| 3,465,616 | 9/1969 | Schou | 74/687 |
| 3,613,481 | 10/1971 | Lapinski | 74/606 R |
| 4,028,965 | 6/1977 | Stockton | 74/687 |
| 4,222,289 | 9/1980 | Watanabe et al. | 74/606 R |
| 4,280,374 | 7/1981 | Kubo et al. | 74/701 |
| 4,281,564 | 8/1981 | Hill | 74/687 |
| 4,329,888 | 5/1982 | Falzoni | 74/694 |
| 4,342,238 | 8/1982 | Gardner | 74/701 |
| 4,364,285 | 12/1982 | Morisawa et al. | 74/606 R |
| 4,368,649 | 1/1983 | Vahratian et al. | 74/701 |

*Primary Examiner*—Leslie A. Braun
*Assistant Examiner*—Bruce F. Wojciechowski
*Attorney, Agent, or Firm*—Blum Kaplan Friedman Silberman and Beran

[57] ABSTRACT

A working fluid distributing system for a continuously-variable speed automatic transmission comprising a fluid coupling; a belt drive continuously-variable speed transmission means including a primary variable-pitch pulley, a secondary variable-pitch pulley and an endless belt interconnecting the primary and the secondary variable-pitch pulleys and capable of attaining continuously-variable speed drive; a change-direction gear train; and a hydraulic control circuit for supplying the working fluid to the component brakes and clutches.

The working fluid distributing system further comprises a supporting collar attached to the wall portion of the housing of the automatic transmission, which wall portion being disposed perpendicularly to the input shaft of the belt drive transmission means. The supporting collar rotatably supports, on the outer surface thereof, the pump impeller of the fluid coupling and, on the inner surface thereof, the input shaft. A plurality of pockets are formed independently of each other and in an arrangement along the circumferential direction in the inner surface of the supportng collar.

The respective pockets communicate with fluid passages bored in the housing wall radially with respect to the axis of the supporting collar and a working fluid source.

Pressurized working fluid is supplied to the respective hydraulic servomechanisms for operating the clutch functioning to connect the primary variable-pitch pulley of the belt drive transmission means to the turbine runner of the fluid coupling and for operating the brake functioning to actuate the change-direction gear train through the pockets formed in the supporting collar and the fluid passages bored radially in the wall portion of the housing.

2 Claims, 5 Drawing Figures

WORKING FLUID DISTRIBUTING SYSTEM FOR A BELT DRIVE CONTINUOUSLY-VARIABLE SPEED AUTOMATIC TRANSMISSION

BACKGROUND OF THE INVENTION

The present invention relates to an improvement in an automatic transmission equipped with a belt drive continuously-variable speed transmission means, which comprises two variable-pitch pulleys and a belt of a V-shape or a trapezoidal cross section extended between the variable-pitch pulleys and is adapted to vary the rotational speed ratio between the respective shafts carrying the variable-pitch pulleys by varying the radial working position of the belt on the variable-pitch pulleys.

There has been known that a continuously-variable speed transmission means, designated as "a belt drive transmission means" hereinafter, comprises a primary variable-pitch pulley and a secondary variable-pitch pulley mounted on an input shaft connected to a prime mover and an output shaft connected to a driven unit respectively, each variable-pitch pulley comprising a fixed pulley flange fixed to the corresponding shaft, a movable pulley flange mounted axially slidably on the same shaft and a spring or the like means urging the movable pulley flange toward the corresponding fixed pulley flange, and a V-belt extended between the primary and the secondary variable-pitch pulleys.

Recently, a link belt, which is formed by linking a number of metallic blocks, each having a cross section similar to that of a V-belt and inclined side surfaces formed so as to fit to the conical surfaces of the fixed and movable pulley flanges and having slits formed in the inclined side surfaces, with metallic belts by fitting the metallic belts in the slits of the metallic blocks, has been developed. The employment of such a link belt in the belt drive transmission means contributes to enhancing the durability of the belt drive transmission means. Thus, trials have been made to employ the belt drive transmission means as an automatic transmission for a motor vehicle equipped with a high-power prime mover by increasing the transmission torque of the belt drive transmission means by pressing the movable pulley flanges toward the corresponding fixed pulley flanges with hydraulic servomechanisms.

SUMMARY OF THE INVENTION

The primary object of the present invention is to provide a working fluid distributing system for a compact continuously-variable speed automatic transmission equipped with a belt drive transmission means, more particularly, to provide a working fluid distributing system for a continuously-variable speed automatic transmission wherein the primary variable-pitch pulley of the belt drive transmission means is mounted on an intermediate shaft provided rotatably and coaxially with the input shaft, a change-direction gear train is mounted either on the input shaft or on the intermediate shaft so that the intermediate shaft is caused to rotate in the forward direction or the reverse direction through the alternate actuation of a clutch and a brake, a supporting collar is provided in order to support the input shaft rotatably on the housing of the automatic transmission, and pressurized working fluid is supplied to the respective servomechanisms for operating the clutch and the brake through pockets formed in the inner surface of the supporting collar and fluid passages bored in the housing radially with respect to the axis of the supporting collar and communicating with the pockets.

Accordingly, the primary object of the present invention is to provide a working fluid distributing system for an automatic transmission equipped with a fluid coupling and a belt drive transmission means especially suitable to form fluid passages in the housing for distributing pressurized fluid to the fluid coupling and hydraulic servomechanisms for the continuously-variable speed change in the radial directions with respect to the input shaft of the transmission means so as to reduce the axial length of a housing of the automatic transmission. The input end of the belt drive transmission means is connected to the output end of a prime mover through the fluid coupling such as a hydraulic torque converter, the fixed pulley flange of the primary variable-pitch pulley is supported on an intermediate shaft which is separated from the input shaft connected with the output end of the fluid coupling, the input shaft and the intermediate shaft are mounted on the housing coaxially and rotatably relative to each other a change-direction gear train is mounted either on the input shaft or on the intermediate shaft with the input end thereof connected with the input shaft and the output end thereof connected with the intermediate shaft for changing-over the rotational direction of the intermediate shaft to a direction the same with the rotational direction of the input shaft or a direction reverse to the rotational direction of the input shaft. A supporting collar for supporting the fluid coupling on the exterior surface thereof is disposed on a wall portion of the housing extending perpendicularly to the axis of the input shaft, a plurality of independent pockets are formed in the interior surface of the supporting collar along the circumferential direction, respective pockets communicate at least with the fluid coupling and the hydraulic servomechanism for operating the clutch or the brake of the change-direction gear train, fluid passages are formed in the housing wall radially of the axis of the supporting collar so as to open into the pockets, and fluid passages are formed so as to distribute the working fluid at least to the fluid coupling and the hydraulic servomechanism for operating the clutch or the brake of the change-direction gear train each of the automatic transmission.

DESCRIPTION OF THE PREFERRED EMBODIMENTS

Figure 1:
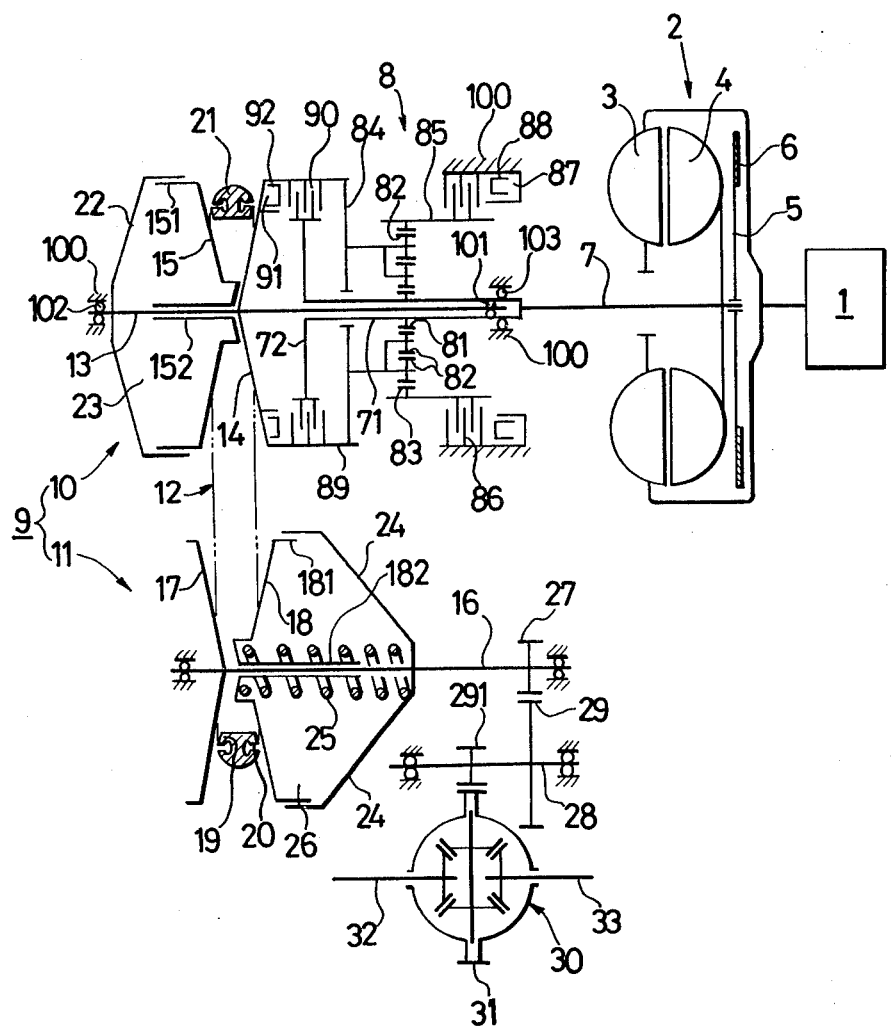
FIG. 1 is a schematic illustration of a belt drive continuously-variable speed automatic transmission suitable for embodying the present invention.
Figure 2:
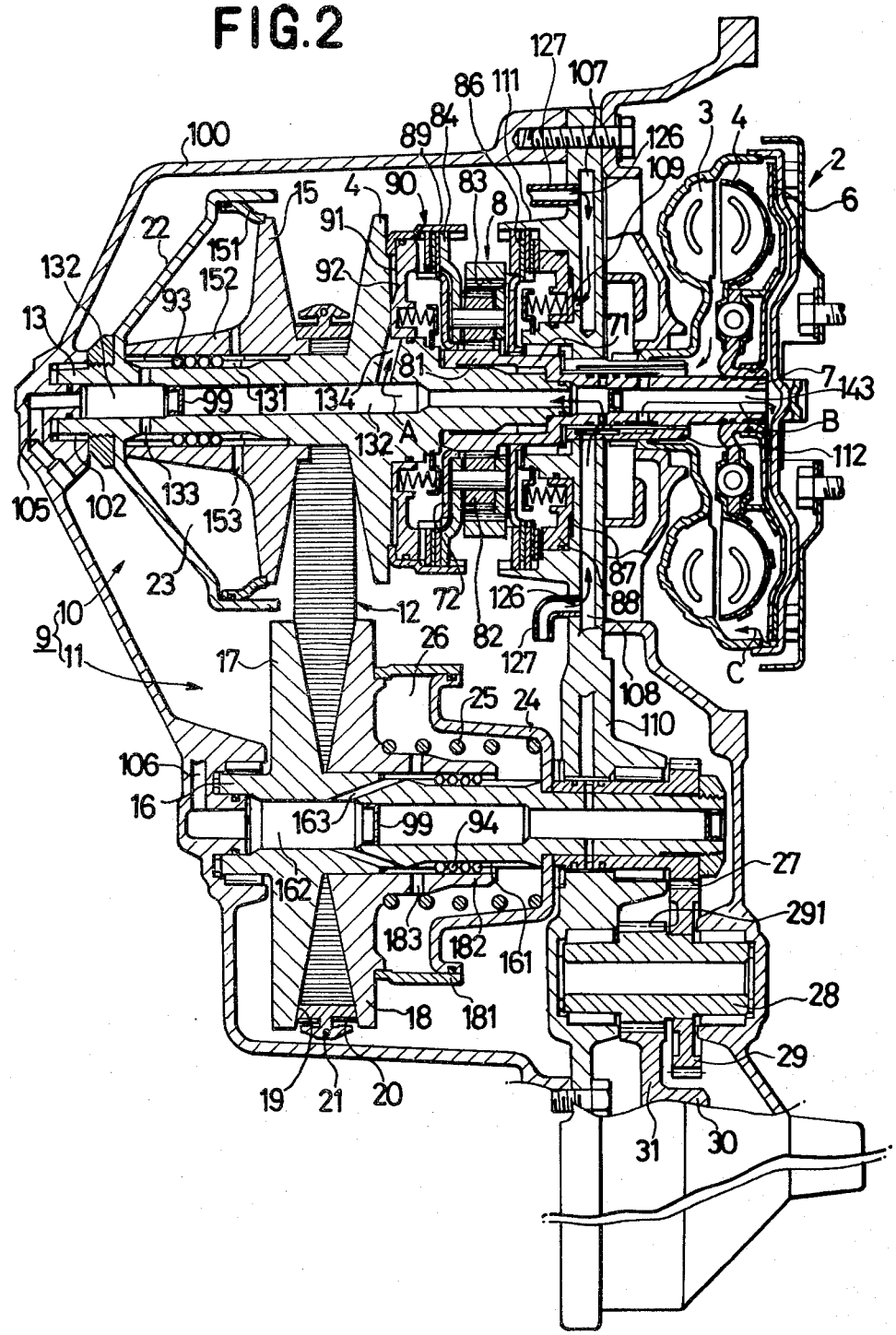
FIG. 2 is a sectional view of the essential part of the belt drive continuously-variable speed automatic transmission embodying the present invention.

The invention will now be described in detail, by way of example, with reference to the accompanying drawings in which:

FIG. 1 is a schematic illustration of an automatic transmission for a motor vehicle equipped with a fluid coupling embodying the present invention;

FIG. 2 is a sectional view of the essential part of the automatic transmission.

In the drawings, an output shaft of an engine 1 is connected with a pump impeller 3 of a fluid coupling 2. A turbine runner 4 of the fluid coupling 2 is connected with an input shaft 7 of the automatic transmission. A direct-coupling clutch for directly connecting the turbine runner 4 to the input shaft 7 and the housing of the fluid coupling 2 is formed. For this object, a clutch plate comprising a piston 5 having a circular frictional plate 6 fixed on one surface thereof is slidably mounted either on the turbine runner 4 or the input shaft 7.

The automatic transmission generally comprises a planetary gear mechanism 8 and a belt drive transmission means 9. The belt drive transmission means 9 comprises generally a primary variable-pitch pulley 10, a secondary variable-pitch pulley 11 and a belt 12. The primary variable-pitch pulley 10 comprises a fixed pulley flange 14 formed concentrically and integrally with an intermediate shaft 13 of the belt drive transmission means and a movable pulley flange 15 mounted axially slidably on the intermediate shaft 13. The secondary variable-pitch pulley 11 comprises a fixed pulley flange 17 formed concentrically and integrally with an output shaft 16 and a movable pulley flange 18 mounted axially slidably on the output shaft 16. The belt 12 is extended between the primary and the secondary variable-pitch pulleys. The belt 12 is, for example, an endless belt of a kind disclosed in the Laid-Open Gazette for patent application Ser. No. 52253/1979, which is formed by arranging a number of metallic blocks 21 in a file and by linking a number of the blocks 21 with metallic bands. Each metallic block 21 has inclined side surfaces 19, 19 on its both sides which fit in the V-shaped grooves of the primary variable-pitch pulley 10 and the secondary variable-pitch pulley 11 and slits 20 formed in the inclined side surfaces 19 for receiving the metallic bands therein.

A cylinder 22 is fixed to the intermediate shaft 13 in liquid-tight engagement with an annular member 151 fixed to the periphery of the movable pulley flange 15 of the primary variable-pitch pulley 10 to form a hydraulic servomechanism for sliding the movable pulley flange 15 toward the fixed pulley flange 14 by supplying pressurized fluid into a cylinder chamber 23 of the cylinder 22 so that the metallic blocks 21 consisting the belt 12 are pressed between the fixed pulley flange 14 and the movable pulley flange 15. A cylinder 24 is fixed to the output shaft 16 in liquid-tight engagement with a cylindrical member 181 welded to the movable pulley flange 18 of the secondary variable-pitch pulley 11, a coil spring 25 is compressed between the cylinder 24 and the movable pulley flange 18 to form a hydraulic servomechanism for sliding the movable pulley flange 18 toward the fixed pulley flange 17 in conjunction with the force of the spring 25 by the pressure of the fluid supplied in a cylinder chamber 26 of the cylinder 24 so that the metallic blocks 21 consisting the belt 12 are pressed between the fixed pulley flange 17 and the movable pulley flange 18. The pressure-receiving area of the cylinder 22 facing the movable pulley flange 15 of the primary variable-pitch pulley 10 facing against the cylinder chamber 23 is made greater than the pressure-receiving area of the movable pulley flange 18 of the secondary variable-pitch pulley 11 facing against the cylinder chamber 26.

When the pressurized fluid is drained from both cylinder chambers 23 and 26, the movable pulley flange 18 of the secondary variable-pitch pulley 11 is moved toward the corresponding fixed pulley flange 17 so that the belt 12 is moved to the outermost radial position on the secondary variable-pitch pulley 11 whereas the belt 12 is moved to the innermost radial position on the primary variable-pitch pulley 10, since the movable pulley flange 18 of the secondary variable-pitch pulley 11 is continuously urged toward the corresponding fixed pulley 17 with the coil spring 25 while no force is applied within the primary variable-pitch pulley 10. In this state, the reduction ratio of the rotational speed transmission from the intermediate shaft 13 to the output shaft 16 is the highest and the torque ratio between the intermediate shaft 13 and the output shaft 16 also is the highest.

When the intermediate shaft 13 is connected to the input shaft 7 and pressurized fluid is supplied to the cylinder chambers 23 and 26 of the hydraulic servomechanisms, the belt 12 is pressed between the respective fixed pulley flanges and the movable pulley flanges of the primary variable-pitch pulley 10 and the secondary variable-pitch pulley 11 and transmits the rotation of the input shaft 7 to the output shaft 16. When pressurized fluid of the same pressure is supplied to the cylinder chamber 23 and 26, the axial pressing force of the movable flange 15 of the primary variable-pitch pulley 10 applied to the belt 12 is greater than that of the movable flange 18 of the secondary variable-pitch pulley 11 applied to the belt 12, since the pressure-receiving area of the moveable flange 15 of the primary variable-pitch pulley 10 is greater than that of the movable pulley flange 18 of the secondary variable-pitch pulley 11, so that the belt 12 is moved radially outward with regard to the intermediate shaft 13 whereby the working radius of the primary variable-pitch pulley 10 cooperating with the belt 12 is increased whereas the working radius of the secondary variable-pitch pulley 11 cooperates with the belt 12 is decreased. Such relative operation of the variable-pitch pulleys 10 and 11 and the belt 12 reduces the reduction ratio of the rotational transmission from the intermediate shaft 13 to the output shaft 16 as well as the torque ratio, thus attaining continuously-variable speed change. It is necessary to balance the pressing force applied to the movable pulley flanges 15 and 18 in order to maintain the belt 12 at a steady position. The reduction ratio (the torque ratio) is maintained at a desired value and the belt 12 is maintained at a steady position on the primary and the secondary variable-pitch pulleys by reducing the pressure of the pressurized fluid supplied to the cylinder 23 of the primary variable-pitch pulley 10 with respect to that supplied to the cylinder 26 of the secondary variable-pitch pulley 11.

A reduction gear train comprises a gear wheel 27 fixed to the output shaft 16, a gear wheel 29 meshing with the gear wheel 27 and fixed to a counter shaft 28, a gear wheel 291 formed integrally with the gear wheel 29 and a gear wheel 31 fixed to the casing of a differential gear 30 and meshing with the gear wheel 291. The roatation of the output shaft 16 is reduced and transmitted to the driving axles 32 and 33 of the vehicle through the differential gear 30.

The input shaft 7 and the intermediate shaft 13 are disposed coaxially within the housing 100 of the automatic transmission. One end of the intermediate shaft 13 is inserted into a hollow shaft portion 71 formed on one end of the input shaft 7 and supported in a bearing 101 on the input shaft 7. The other end of the intermediate shaft 13 is rotatably supported in a bearing 102 on the housing 100. The input shaft 7 is supported rotatably in a bearing 103 on the housing 100 at an axial position adjacent to or corresponding to the bearing 101 provided at the position radially outward of the bearing 101.

The planetary gear mechanism 8 comprises a sun gear 81 mounted on the hollow shaft portion 71 concentrically with the input shaft 7, double planetary pinions 82, a ring gear 83 and a planetary carrier 84 rotatably carrying the planetary pinions 82. The sun gear 81 is formed integrally with the hollow shaft portion 71. The planetary pinions 82 are meshing with each other, one of which is meshed with the sun gear 81 while the other is meshed with the ring gear 83. A multiple-disc brake 86 is formed between a drum 85 formed integrally with the ring gear 83 and the housing 100 of the automatic transmission. The ring gear 83 is controlled to be engaged with the housing 100 or to be allowed to rotate by means of a hydraulic servomechanism comprising a cylinder 87 formed in the housing 100 and a piston 88. The planetary carrier 84 is engaged with a hub 89 attached to the periphery of the fixed pulley flange 14 by means of spline coupling so that the planetary carrier 84 is rotated together with the intermediate shaft 13. A clutch hub 72 is fixed to one end of the hollow shaft portion 71 of the input shaft 7. A multiple-disc clutch 90 is formed between the clutch hub 72 and the hub 89 of the fixed pulley flange 14. The multiple-disc clutch 90 is operated by a hydraulic servomechanism comprising a cylinder 91 formed by the back side of the fixed pulley falnge 14 and the hub 89 and a piston slidably fitted in the cylinder 91 so that the intermediate shaft 13 is adapted to be engaged to or released from the input shaft 7.

It will be noted particularly in FIG. 2 that the respective movable pulley flanges 15 and 18 of the primary and the secondary variable-pitch pulleys 10 and 11 are provided with cylindrical bosses 152 and 182 formed integrally with the movable pulley flanges 15 and 18 respectively. The respective cylindrical bosses 152 and 182 are partly in liquid-tight contact with the outside surfaces of the intermediate shaft 13 and the output shaft 16 respectively, while partly supported by spherical members 93 and 94 arranged within axial grooves 131 and 161 of the intermediate shaft 13 and the output shaft 16 respectively.

Pressurized fluid is supplied into the cylinder 23 of the hydraulic servomechanism of the primary variable-pitch pulley 10 via a passage 105 formed in the housing 100, an axial hole 132 formed in the intermediate shaft 13, a through hole 133 and the axial groove 131 formed in the intermediate shaft 13, and a through hole 153 formed in the cylindrical boss 152, or drained via the same passage in the reverse direction. Pressurized fluid is supplied into the cylinder 26 of the hydraulic servomechanism of the secondary variable-pitch pulley 11 via a passage 106 formed in the housing 100, an axial hole 162 and a through hole 163 formed in the output shaft 16, the axial groove 161 and a through hole 183 formed in the cylindrical boss 182, or drained via the same passage in the reverse direction.

Pressurized fluid is supplied into or drained from the cylinder 87 of the hydraulic servomechanism for operating the multiple-disc brake 86 via a passage 107 and 109 formed in the housing 100. Pressurized fluid is supplied into the cylinder 91 of the hydraulic servomechanism for operating the clutch 90 via a passage 108 formed in the housing 100, the axial hole 133 formed in the intermediate shaft 13 and a through hole 134 formed in the intermediate shaft 13, or drained via the same passage in the reverse direction. In FIG. 2, plugs fitted in the axial holes 132 and 162 are indicated by reference numeral 99.

Although an automatic transmission equipped with a fluid coupling is shown in the drawings, it is obvious that a hydraulic torque converter may replace the fluid coupling.

Figure 3:
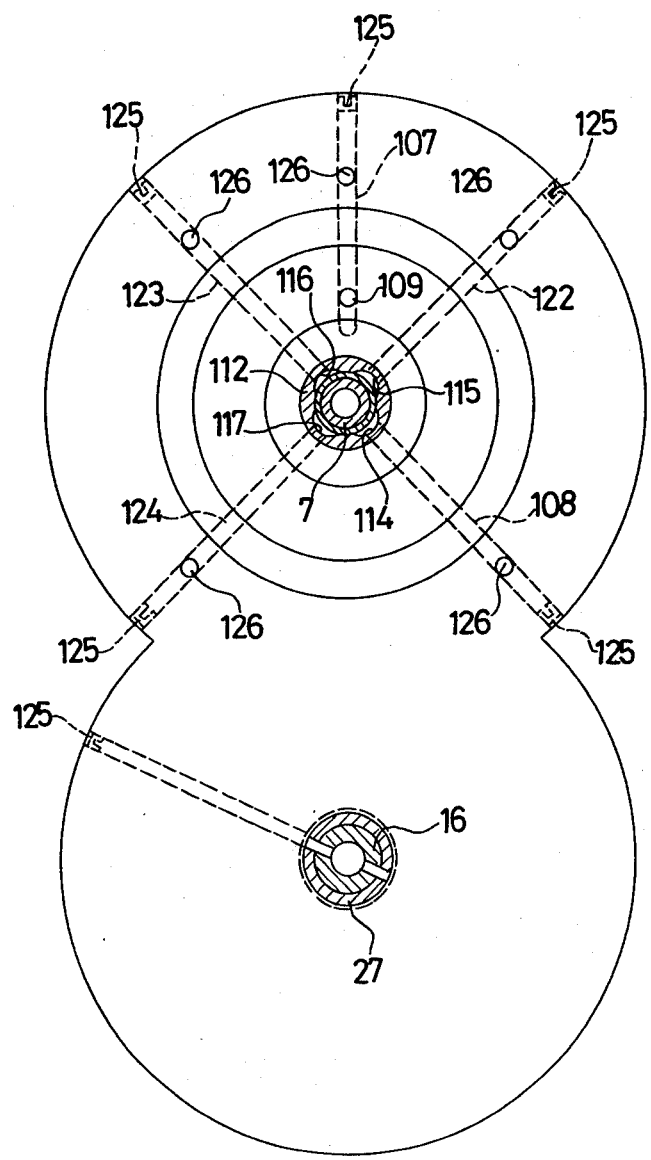
FIG. 3 is a front elevation of the wall portion of the housing.
Figure 4:
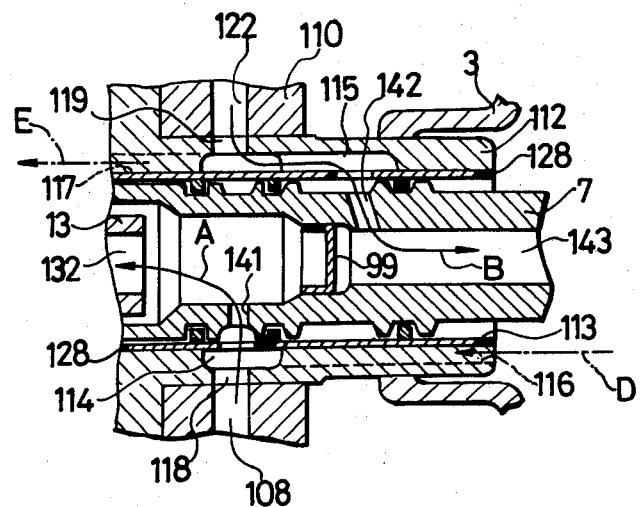
FIG. 4 is a sectional view of the essential part of the wall portion of the housing.

FIG. 3 is a plan view of a wall portion of a housing 100 supporting the output end of the fluid coupling and the input shaft 7, and FIG. 4 is a sectional view of the essential part of the wall portion of the housing.

Figure 5:
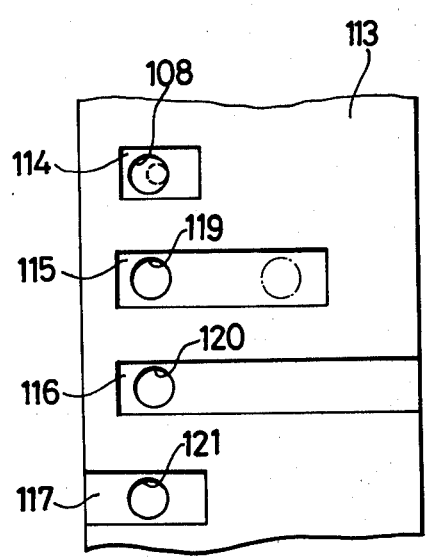
FIG. 5 is the development of the inner surface of the supporting collar.

A wall portion 110 of the housing 100 is disposed in perpendicular to the axis of the input shaft 7. A cylindrical wall 111 for supporitng the multiple-disc clutch 86 is provided on the wall portion 110. A supporting collar 112 penetrates and is fixed to the wall portion 110 providing the axis thereof perpendicular to the wall portion and concentrically with the cylinder 87 for rotatably supporting the pump impeller 3 of the fluid coupling 2 on the exterior surface thereof. Four elongated pockets 114, 115, 116 and 117 are formed in the interior surface 113 of the axial bore of the supporting collar 112 in the manner as shown in FIG. 5 showing the development of the inner surface 113 in which the pockets are formed with their lengthwise direction in parallel with the axial direction of the supporting collar 112 and are arranged along the circumferential direction of the supporting collar 112 at suitable intervals. A cylindrical member 128 having a thin wall is fitted in the axial bore of the supporting collar 112 so that the pockets 114 and 117 are separated from each other. The respective one ends of the pockets 116 and 117 are opened at the corresponding ends of the supporting collar 112 to the interior of the housing. Holes 118, 119, 120 and 121 bored on the supporting collar 112 communicate with the pockets 114, 115, 116 and 117 respectively. Fluid passages 108, 122, 123 and 124 bored in the wall portion 110 radially with respect to the axis of the supporting collar 112 from the periphery thereof toward the supporting collar 112 communicate with the holes 118, 119, 120 and 121 respectively. One end of each of the fluid passages 108, 122, 123 and 124 is closed with a plug 125. A fluid passage 107 also is bored in the wall portion 110 radially with respect to the supporting collar 112 by a length to communicate with the passage 109 as shown in FIG. 3. The fluid passage 107 communicates with the cylinder 87 for operating the multiple-disc brake 86 by means of the passage 109.

The fluid passages 107, 108, 122, 123 and 124 communicate with communicating holes 126 opening on one surface of the housing wall 110. As shown representatively by the fluid passages 107 and 108 in FIG. 2, each communicating hole 126 communicates with the source of the working fluid by means of a pipe 127 fitted in the communicating hole 126. As shown in FIGS. 3 to 5, the working fluid is supplied from the fluid passage 108 into the cylinder 91 via the hole 118 of the supporting collar 112, the pocket 114, the hole 141 of the input shaft 7 and the axial bore 133 of the intermediate shaft 13 as shown by the arrow A in FIG. 2. The working fluid is supplied from the fluid passage 122 into the axial bore 143 of the intermediate shaft via the hole 119 of the supporting collar 112, the pocket 115 and the hole 142 of the input shaft 7 as shown by the arrow B, into the peripheral space around the pump impeller 3 and the turbine runner 4 through a space between the housing of the fluid coupling 2 and the piston 5 as shown by the arrow C. Then, the working fluid flows into the pocket 116 through the circumference of the input shaft 7 and the opening end of the pocket 116 as shown by the arrow D, then returns into the reservoir via the hole 120, the fluid passage 123 and the cooler. The working fluid is supplied from the fluid passage 124 into the pocket 117 via the hole 121 of the supporting collar 112, then distributed, as shown by the arrow E in FIG. 4, via the opening end of the pocket 117 to the planetary gear mechanism 8 and other parts to be lubricated.

The working fluid distributing system for the belt drive continously-variable speed automotic transmission according to the present invention, comprises a belt drive continuously-variable speed transmission means capable of steplessly changing the rotational speed ratio between the input shaft and the output shaft by means of the primary variable-pitch pulley mounted on the intermediate shaft, the secondary variable-pitch pulley mounted on the output shaft and the endless belt extended between the primary and the secondary variable-pitch pulleys and wherein the intermediate shaft is supported on the housing rotatably and coaxially with the input shaft connected to the output end of the fluid coupling, such as a hydraulic torque converter, the change-direction gear train is mounted either on the input shaft or on the intermediate shaft, and the intermediate shaft is rotated in the forward direction together with the input shaft by direct coupling or the intermediate shaft is rotated in the reverse direction with respect to the rotational direction of the input shaft by the operation of the clutch or the brake operated by hydraulic servomechanisms. Consequently, the smooth operation of the belt drive continuously-variable speed transmission means is enhanced by the function of the fluid coupling and the stepless speed change of the output shaft both in the forward and in the reverse rotation. Furthermore, the supporting collar penetrates perpendicularly into and is fixed to the wall portion of the housing wall disposed perpendicularly to the axis of the input shaft, so as to support the input end of the fluid coupling is rotatably on the exterior surface of the supporting collar and the input shaft rotatably in the interior bore of the supporting collar. A plurality of independent pockets are formed in the interior surface of the supporting collar along the circumferential direction, fluid passages are formed in the wall portion of the housing wall radially with respect to the axis of the supporting collar from the periphery of the wall portion into the pockets, the pockets communicates with at least the hydraulic servomechanism for operating the clutch or the brake and the fluid coupling, so as to communicate the source of the pressurized fluid at least to the fluid coupling and to the hydraulic servomechanism for operating the clutch or the brake, which are disposed adjacently to the surfaces of the wall portion of the housing, through the fluid passages bored into the wall portion of the housing via the pockets formed in the supporting collar, therefore, it is not necessary to form a complicated fluid passage in the input shaft and, at the same time, the axial length of the input shaft can be reduced. The pockets formed in the interior surface of the supporting collar can be separated from each other simply by forming grooves in the inner circumference of the supporting collar, and then by closely fitting a cylindrical member of a thin wall in the bore of the supporting collar so that only a supporting collar of a moderate wall thickness is necessary and the construction can be extremely simplified since the communication of the pockets with the fluid passages can be attained simply by forming holes in the supporting collar and the cylindrical member at suitable positions thereon.

What is claimed is:

1. A working fluid distributing system for a belt drive continuously-variable speed automatic transmission, comprising:
    a housing;
    a fluid coupling;
    an input shaft connected to the output end of said fluid coupling;
    a supporting collar penetrating perpendicularly through and attached to a wall portion of said housing being positioned perpendicularly to the axis of said input shaft, and adapted to rotatably support the input end of said fluid coupling on the exterior surface thereof and to rotatably support said input shaft on the interior surface thereof;
    an intermediate shaft arranged coaxially with said input shaft and rotatably supported on said input shaft at one end thereof and on said housing at the other end thereof;
    an output shaft supported rotatably on said housing in parallel with said intermediate shaft as well as to said input shaft;
    a belt drive continuously-variable speed transmission means comprising a primary variable-pitch pulley including a fixed pulley flange fixed concentrically to said intermediate shaft and a movable pulley flange being slidable axially and relatively to said fixed pulley flange, a secondary variable-pitch pulley including a fixed pulley flange fixed concentrically to said output shaft and a movable pulley flange being slidable axially and relatively to said fixed pulley flange, and an endless belt extended between said primary and said secondary variable-pitch pulleys for interconnecting said primary and said secondary pulleys and for transmitting the rotation of the intermediate shaft to the output shaft and changing the rotational speed ratio between said intermediate shaft and said output shaft;
    a change direction gear train mounted on one of said input shaft and said intermediate shaft, connected to said input shaft at the input end thereof and to said intermediate shaft at the output end thereof and adapted to rotate the output shaft to a direction the same with the rotational direction of the intermediate shaft or to rotate the output shaft to a direction reverse to the rotational direction of the intermediate shaft by the operation of a clutch or a brake being operated by a hydraulic servomechanism engaged thereto, respectively;
    a plurality of pockets formed independently in the interior surface of said supporting collar along the circumferential direction;
    a cylindrical member fitted in the axial bore of said supporting collar for separating said pockets from each other; and
    fluid passages formed in said housing radially of said supporting collar as to communicate with said pockets, said pockets being connected with respective fluid passages and communicating with at least said fluid coupling and said hydraulic servomechanism for operating at least one of said clutch and said brake.

2. The working fluid distributing system of claim 1 wherein the plurality of pockets are formed with their lengthwise direction in parallel with the axial direction of the supporting collar.

* * * * *